May 19, 1959

L. D. THOMAS 2,887,412

ELECTRICALLY CONDUCTING GLASS UNIT AND
METHOD OF MAKING SAME

Filed Aug. 27, 1956

INVENTOR.
Lazarus D. Thomas
BY
Nobbe & Swope
ATTORNEYS

2,887,412
ELECTRICALLY CONDUCTING GLASS UNIT AND METHOD OF MAKING SAME

Lazarus D. Thomas, Walbridge, Ohio, assignor to Libbey-Owens-Ford Glass Company, Toledo, Ohio, a corporation of Ohio Application August 27, 1956, Serial No. 606,277

5 Claims. (Cl. 117—211)

The present invention relates broadly to electrically conducting glass of the type made up of a sheet of glass having a transparent electrically conducting film, in contact with metal electrodes, on a surface thereof. More particularly it has to do with a method of preparing an article of the above general character in which the weak and high resistance interface between the electrode and the electrically conducting film that has been characteristic with certain film compositions does not exist.

Now transparent, electrically conducting films such as tin oxide films are well known; and de-icing windshields or windows for aircraft, which involve such films on a glass sheet provided with spaced metal electrodes, have been used commercially. Moreover, the problems of arcing at the juncture or meeting line of the electrically conducting film and the electrodes, or at the electrode-film interface, especially with a tin oxide film and silver electrodes has been recognized and vigorous steps have been taken in attempting to overcome it.

In fact, this problem has been set forth in considerable detail in a patent to Romey A. Gaiser, No. 2,628,299, issued February 10, 1953. In addition, this patent discloses a solution to the problem which involves an air-dry silver bridge or overlay over the joints between the film and the electrodes. The invention of that patent has been widely used in the commercial production of aircraft glass, and has proved to be entirely satisfactory for the purpose. However, as now commonly employed, it entails and requires an additional step in an already expensive and time consuming procedure.

Other suggested methods of overcoming this difficulty have involved the addition of ingredients to the electrically conducting film. While certain of the ingredients used are satisfactory for reducing or eliminating the problem of arcing between the electrically conducting film and the electrodes, many of these methods have had the disadvantage of providing an additional ingredient to the film with a corresponding decrease in light transmission. Also, some of these ingredients cause an unwanted change in electrical properties and a slight color.

It is therefore a primary object of the present invention to provide an electrically conducting glass unit of the general character above described having a relatively strong and low resistance interface between the metal electrode and the electrically conducting film without the need for changing the electrically conducting film or the necessity for extra process steps in addition to those of film and electrode application.

According to this invention, the above object is achieved by the provision of an electrode of a special composition such that when an electrically conducting film is applied in the conventional manner there is substantially no likelihood of failure due to high resistance at the interface between the electrode and the electrically conducting film.

Briefly stated, the invention is based on my discovery that such a unit is provided when certain sulfide compounds such as hydrogen sulfide are incorporated in the electrode material before the same is fired on to the glass surface.

It is believed that the high interfacial resistance heretofore encountered is caused by the formation of a silver halide film or layer over the surface of the fired-on silver electrode during the formation of the tin oxide film, and it has been found that when halide ion is absent from the filming solution, that substantially no interfacial resistance problem is encountered. However, it is desirable to use halide filming materials because of the superior results achieved thereby. Accordingly, this invention is not only applicable to electrically conducting tin oxide films, but also to electrically conducting films of other metals which may be formed from a metal halide material.

In its broad aspect, this invention indcludes treatment of the electrode material by sulfide compounds as well as the incorporation of sulfide compounds into the glass frit before firing. However, as will be explained hereinafter it is preferred to add the sulfide to the electrode material before the same is fired and hydrogen sulfide is preferred in this procedure.

Other objects and advantages of the invention will become more apparent during the course of the following description, when taken in connection with the accompanying drawings.

In the drawings, wherein like numerals are employed to designate like parts throughout the same:

Figure 1:
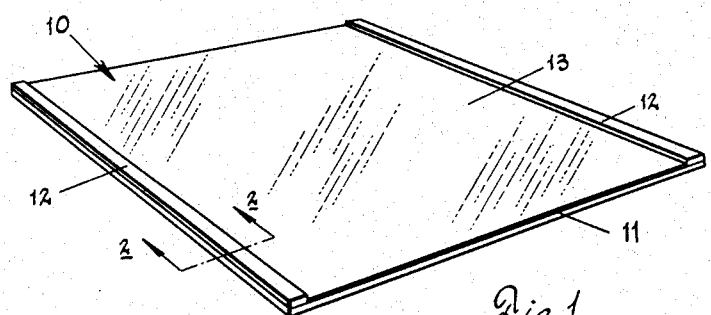
Fig. 1 is a perspective view of a filmed glass sheet provided with electrodes along two opposite marginal portions thereof.
Figure 2:
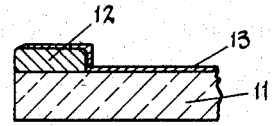
Fig. 2 is a fragmentary sectional view on a greatly enlarged scale taken substantially along the line 2—2 in Fig. 1.

In Figs. 1 and 2, there is shown a typical electrically conducting glass unit 10 which comprises a glass sheet 11 having a pair of electrodes 12 disposed along opposite margins thereof and an electrically conducting film 13 on a surface of a glass sheet 11 and in electrical contact with the electrodes 12. In order to prepare such a unit in accordance with this invention, a sheet of glass 11 is first provided along opposite margins thereof with special electrodes 12 of a composition prepared by a procedure which will be more fully described below.

With the electrodes in place, the sheet 11 may be hung from tongs 14 suspended from a carriage 15 provided with wheels 16 running on a monorail 17. In this way, the sheet can be passed into and through a tunnel-like furnace 18 within which it is heated to substantially its point of softening to simultaneously prepare the sheet for filming and to fire the electrode onto the glass. After the sheet 11 has reached the required temperature it is removed from the furnace and brought into filming position as shown in Fig. 3 where it is uniformly sprayed over its entire surface with a filming liquid from the spray guns 19.

Figure 4:
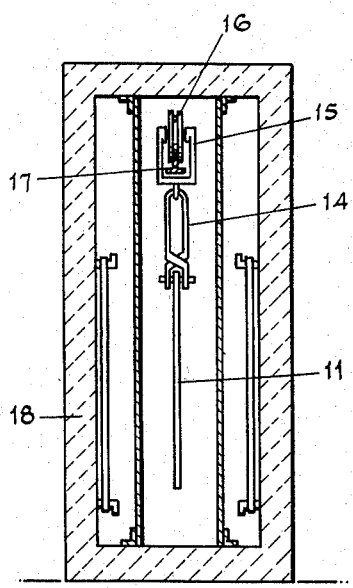
Fig. 4 is a vertical sectional view through a heating furnace which may be used to fire the electrodes on the glass sheet at the same time the sheet is being heated prior to filming.
Figure 5:
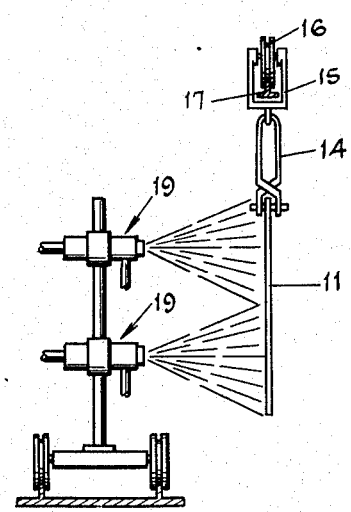
Fig. 5 is an end view of a spraying apparatus for applying the filming material to the heated glass.

The filming liquid may be a solution of tin halides such as any of the tin compounds known to produce a film of the desired characteristics. For example, stannic tetrachloride will react with the hot glass to leave a thin, transparent, tightly adherent, electrically conducting film or coating 19 of tin oxide on the glass; and, as can be seen in Fig. 4 the film covers the entire surface of the glass between the electrodes 12 and is in electrical contact with the electrodes. The electrically conducting film 19 may be applied by any of the well known procedures for applying such a film and it is to be understood that this invention is not limited to tin oxide films prepared from solutions of tin halides as set forth in the illustration, although the invention is particularly valuable for use with such films, especially when used with silver electrodes, because this combination presents the greatest interface problems.

It is contemplated that the electrodes 12 may be composed of any one of a number of metals, but the invention will be described in connection with fired-on silver electrodes, because as indicated above these present the greatest problems. A typical silver-flux that may be used for the purpose is made of 65.6% silver, 7.8% frit, 18% organic binder, and 8.54% thinner. In the following example, the silver-flux referred to is of such a composition, but the invention applies equally well to any silver-flux composition that is suitable for such electrode use.

Figure 3:
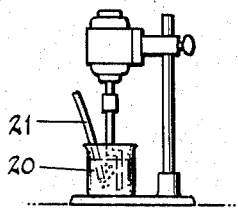
Fig. 3 is a diagrammatic view illustrating a preferred method of treating the electrode material prior to application and firing.

The above mentioned silver-flux may be added to a beaker 20 as shown in Fig. 3 and $H_2S$ bubbled into the material through a gas delivery tube 21 for a period of five minutes. During the addition of $H_2S$ the solution may be stirred as shown in the illustration.

The effect of this sulfide treatment was measured by preparing a group of four glass sheets 6" x 6" x ¼" using the $H_2S$ treated silver-flux mixture and four similar blanks using untreated silver-flux. Both groups of sheets were filmed alternately with exactly the same filming solution which consisted of a spray containing 30% stannic tetrachloride in isopropanol alcohol and various minor ingredients. After filming, the two groups of sheets were measured for resistance between the electrodes to measure the overall resistance of the film and interface. Then, in order to remove the interface resistance and measure the actual film resistance, an air-dry silver bridge or overlay was applied over the junction of the film and the electrodes and the resistance measured again. The difference between these measurements provides the interfacial resistance. These measurements are shown in the table below:

Table

TREATED ELECTRODE

| Resistance Before Bridging, Ohms | Resistance After Bridging, Ohms | Interfacial Resistance |
|---|---|---|
| 127 | 97 | 30 |
| 145 | 93 | 52 |
| 148 | 100 | 48 |
| 140 | 99 | 41 |
| ¹ 140 | ¹ 97 | ¹ 43 |

| UNTREATED ELECTRODE | | |
|---|---|---|
| 340 | 100 | 240 |
| 230 | 98 | 132 |
| 320 | 89 | 231 |
| 440 | 100 | 340 |
| ¹ 332 | ¹ 97 | ¹ 236 |

¹ Average.

The table above graphically illustrates the positive effect of the hydrogen sulfide treatment on the interface resistance. It illustrates that although interfacial resistance was not completely eliminated, it was lowered to a value between ⅕ and ⅙ of the original interface resistance. This is sufficient to prevent arcing at the junction and complete breakdown of the unit at the interface.

Although hydrogen sulfide is the preferred sulfide, other sulfide materials may be added to the silver-flux to lower the interfacial resistance or the sulfide may be applied to the surface of the flux after it is placed on the glass and before firing. Also, the interfacial resistance may be lowered by firing an untreated silver-flux electrode and treating the fired-on electrode with a sulfide. When solid sulfides are used, this entails an additional step and is therefore not considered to be as satisfactory as the method shown in the example above. However, the fired-on electrode may be subjected to a jet of $H_2S$ while still hot and thereby reduce the interfacial resistance without interfering to any great extent with the standard procedure for preparing electrically conducting glass.

It is to be understood that the forms of the invention disclosed herein are to be taken as the preferred embodiments thereof, and that various procedural changes may be resorted to without departing from the spirit of the invention or the scope of the following claims.

I claim:

1. In an electrically conducting glass unit including an electrically conducting film on a glass surface, an essentially silver electrode attached to the glass surface and in electrical contact with said film and having an amount of hydrogen sulfide incorporated therein sufficient to lower the film-electrode interface resistance to a value less than one-half of the film-electrode interface resistance in the absence of the sulfide.

2. In an electrically conducting glass unit including an electrically conducting film on the glass, an electrode fused onto the glass unit and in electrical contact with said film, said electrode comprising the product of fusing a mixture of finely divided silver, glass frit, organic binder, organic thinner and hydrogen sulfide.

3. A method of producing an electrically conducting glass unit, which comprises applying strips of silver-flux in liquid form having hydrogen sulfide incorporated therein along spaced lines on the surface of a glass sheet, heating said sheet to approximately its softening point to form fired-on electrodes, and spraying the heated sheet with a solution of a metal halide to form a metal oxide film in permanent electrical contact with the fired-on electrode.

4. A method of producing an electrically conducting glass unit, which comprises applying strips of silver-flux along spaced lines on the surface of a glass sheet, said silver-flux comprising finely divided silver, glass frit, organic binder, organic thinner, and hydrogen sulfide, heating the said sheet to approximately its softening point to form fired-on electrodes, and spraying the heated sheet with a solution of a tin halide to form a tin oxide film in permanent electrical contact with the fired-on electrodes.

5. A method of producing an electrically conducting glass unit, which comprises applying strips of silver-flux in liquid form along spaced lines on the surface of the glass sheet, heating the said sheet to approximately its softening point to fire on the silver-flux, subjecting the fired-on silver electrode to a jet of gaseous hydrogen sulfide, and then spraying the heated sheet with a solution of tin halide to form a tin oxide film in permanent electrical contact with the electrodes.

References Cited in the file of this patent

UNITED STATES PATENTS 2,614,944    Lytle _____ Oct. 21, 1952